US010458280B2

(12) United States Patent
Sawyers-Abbott

(10) Patent No.: US 10,458,280 B2
(45) Date of Patent: Oct. 29, 2019

(54) GAS TURBINE ENGINE HYDRAULICALLY OPERATED NACELLE LATCH

(71) Applicant: UNITED TECHNOLOGIES CORPORATION, Hartford, CT (US)

(72) Inventor: Nigel David Sawyers-Abbott, South Glastonbury, CT (US)

(73) Assignee: United Technologies Corporation, Farmington, CT (US)

(*) Notice: Subject to any disclaimer, the term of this patent is extended or adjusted under 35 U.S.C. 154(b) by 632 days.

(21) Appl. No.: 14/765,877

(22) PCT Filed: Mar. 7, 2014

(86) PCT No.: PCT/US2014/021477
§ 371 (c)(1),
(2) Date: Aug. 5, 2015

(87) PCT Pub. No.: WO2014/164238
PCT Pub. Date: Oct. 9, 2014

(65) Prior Publication Data
US 2015/0377071 A1 Dec. 31, 2015

Related U.S. Application Data

(60) Provisional application No. 61/778,494, filed on Mar. 13, 2013.

(51) Int. Cl.
*F01D 25/24* (2006.01)
*F01D 25/28* (2006.01)
(Continued)

(52) U.S. Cl.
CPC ............. *F01D 25/28* (2013.01); *B64D 29/06* (2013.01); *F01D 25/24* (2013.01); *F02C 3/04* (2013.01);
(Continued)

(58) Field of Classification Search
CPC ......... F01D 25/24; F01D 25/28; B64D 29/06; F02C 7/00; F02K 1/763
See application file for complete search history.

(56) References Cited

U.S. PATENT DOCUMENTS 3,194,595 A * 7/1965 Wheeler ............... E05C 19/145
292/113
3,475,000 A * 10/1969 Hore ..................... F15B 11/048
251/30.05
(Continued)

FOREIGN PATENT DOCUMENTS

FR 2711187 A1 4/1995
GB 692104 A 5/1953

OTHER PUBLICATIONS

International Preliminary Report on Patentability for International Application No. PCT/US2014/021477 dated Sep. 24, 2015.
(Continued)

*Primary Examiner* — Todd E Manahan
*Assistant Examiner* — Eric W Linderman
(74) *Attorney, Agent, or Firm* — Carlson, Gaskey & Olds, P.C.

(57) ABSTRACT

A method of actuating a hydraulic latch and a fan duct includes providing a pressurized fluid for actuating a latch, providing a valve to control flow of pressurized fluid to the latch and the fan duct, and selectively opening the valve, whereby the pressurized fluid opens the fan duct. A gas turbine engine includes a fan duct with an inner structure surrounding an engine core, a fan case surrounding a fan, and at least one latch. The at least one latch secures a first portion of the fan duct inner structure to a core engine fame or to a second portion of the fan duct inner structure. The at least one latch is also configured to secure the second portion
(Continued)

of the fan duct inner structure to the core engine fame or to the first portion of the fan duct inner structure.

12 Claims, 9 Drawing Sheets

(51) Int. Cl.
    *F02K 1/76*           (2006.01)
    *B64D 29/06*         (2006.01)
    *B64D 29/08*         (2006.01)
    *F02C 7/20*          (2006.01)
    *F02C 7/00*          (2006.01)
    *F02C 3/04*          (2006.01)

(52) U.S. Cl.
    CPC ................ *F02C 7/00* (2013.01); *F02K 1/763* (2013.01); *F02C 7/20* (2013.01); *F05D 2260/30* (2013.01); *F05D 2260/406* (2013.01)

(56) References Cited

U.S. PATENT DOCUMENTS

| | | | | |
|---|---|---|---|---|
| 4,194,264 A * | 3/1980 | Stoffregen | E05C 17/30 | 16/52 |
| 4,320,912 A * | 3/1982 | Grace | E05B 15/025 | 292/341.18 |
| 4,365,775 A * | 12/1982 | Glancy | B64D 29/06 | 244/129.4 |
| 4,391,409 A * | 7/1983 | Scholz | F02K 1/763 | 239/265.29 |
| 4,399,966 A * | 8/1983 | Crudden | B64D 29/08 | 244/129.4 |
| 4,538,843 A * | 9/1985 | Harris | B64D 29/06 | 292/113 |
| 4,549,708 A * | 10/1985 | Norris | B64D 29/06 | 244/129.4 |
| 4,585,172 A * | 4/1986 | Gazzera | F15B 11/22 | 239/265.33 |
| 4,585,189 A * | 4/1986 | Buxton | B64D 29/08 | 244/129.4 |
| 4,679,750 A * | 7/1987 | Burhans | B64D 29/06 | 244/129.4 |
| 4,683,717 A * | 8/1987 | Naud | B64D 29/08 | 60/226.1 |
| 4,790,495 A * | 12/1988 | Greathouse | F02K 1/60 | 239/265.29 |
| 4,858,970 A * | 8/1989 | Tedesco | E05C 19/145 | 292/109 |
| 5,046,689 A * | 9/1991 | Shine | B64D 29/06 | 244/129.4 |
| 5,076,514 A * | 12/1991 | Melcher | B64D 29/06 | 244/129.4 |
| 5,224,342 A * | 7/1993 | Lair | F02K 1/766 | 239/265.33 |
| 5,350,136 A * | 9/1994 | Prosser | B64D 29/08 | 244/118.2 |
| 5,372,338 A * | 12/1994 | Carlin | B64D 27/18 | 244/129.4 |
| 5,609,020 A * | 3/1997 | Jackson | F02K 1/76 | 244/110 B |
| 5,915,765 A * | 6/1999 | Sternberger | B64D 29/06 | 24/270 |
| 5,944,285 A * | 8/1999 | Royer | B64C 1/1453 | 244/129.4 |
| 6,032,901 A * | 3/2000 | Carimali | B64D 29/06 | 244/129.4 |
| 6,227,485 B1 * | 5/2001 | Porte | B64D 29/08 | 244/53 B |
| 6,325,428 B1 * | 12/2001 | Do | B64D 29/06 | 244/129.4 |
| 6,334,730 B1 * | 1/2002 | Porte | B64D 29/08 | 244/129.5 |
| 6,629,712 B2 * | 10/2003 | Jackson | B64D 29/02 | 244/129.4 |
| 7,040,578 B2 * | 5/2006 | Halin | B64D 29/06 | 244/129.4 |
| 7,255,307 B2 * | 8/2007 | Mayes | B64D 29/06 | 244/129.5 |
| 7,275,362 B2 * | 10/2007 | Strunk | F02K 1/766 | 244/110 B |
| 7,559,507 B2 * | 7/2009 | Harrison | F02K 1/72 | 244/110 B |
| 7,994,940 B2 * | 8/2011 | Grichener | B64D 29/06 | 340/5.64 |
| 8,170,771 B2 * | 5/2012 | Calmelat | F02K 1/76 | 60/226.2 |
| 8,240,600 B2 * | 8/2012 | Balk | B64D 27/26 | 244/54 |
| 8,641,370 B2 * | 2/2014 | Provost | B64D 29/06 | 415/127 |
| 8,713,911 B2 * | 5/2014 | Kopecek | F02K 1/72 | 239/265.19 |
| 8,869,506 B2 * | 10/2014 | Joret | B64D 29/06 | 244/110 B |
| 8,925,979 B2 * | 1/2015 | Hernandez | E05B 63/143 | 292/113 |
| 9,004,855 B2 * | 4/2015 | Vauchel | B64D 29/08 | 415/126 |
| 9,376,215 B2 * | 6/2016 | Forcier | B64D 29/06 |
| 9,845,708 B2 * | 12/2017 | Forcier | B64D 29/06 |
| 9,951,718 B2 * | 4/2018 | Brown | F02K 1/54 |
| 2002/0017623 A1 * | 2/2002 | Noyes | F16K 1/14 | 251/61 |
| 2003/0024236 A1 | 2/2003 | Lymons et al. | | |
| 2003/0033796 A1 | 2/2003 | Dixon | | |
| 2003/0126856 A1 | 7/2003 | Lair | | |
| 2006/0038410 A1 * | 2/2006 | Pratt | B64D 29/06 | 292/144 |
| 2006/0052664 A1 * | 3/2006 | Julian | A61B 1/0053 | 600/146 |
| 2007/0208238 A1 * | 9/2007 | Harjunmaa | A61B 5/14532 | 600/316 |
| 2007/0237575 A1 * | 10/2007 | Dilno | F02K 1/763 | 403/410 |
| 2008/0197641 A1 * | 8/2008 | Heino | B64D 29/06 | 292/80 |
| 2009/0071122 A1 * | 3/2009 | Maguire | F02C 7/20 | 60/226.2 |
| 2009/0173823 A1 * | 7/2009 | Shetzer | B64D 29/06 | 244/129.4 |
| 2009/0284024 A1 * | 11/2009 | DeLeonardis | E05B 47/0002 | 292/145 |
| 2010/0026482 A1 * | 2/2010 | Grichener | B64D 29/06 | 340/539.1 |
| 2010/0051112 A1 * | 3/2010 | Dieling | F02C 7/04 | 137/15.1 |
| 2010/0148012 A1 * | 6/2010 | McDonough | B64D 29/00 | 244/53 B |
| 2010/0171319 A1 * | 7/2010 | Joret | B64D 29/06 | 292/96 |
| 2011/0036651 A1 * | 2/2011 | Majkrzak | F16H 61/4078 | 180/53.4 |
| 2011/0113837 A1 * | 5/2011 | Soulier | B64D 29/06 | 70/237 |
| 2012/0043978 A1 * | 2/2012 | Eriksen | B64D 29/06 | 324/690 |
| 2012/0125191 A1 * | 5/2012 | Moradell-Casellas | B64D 29/06 | 92/15 |
| 2012/0137654 A1 * | 6/2012 | Burgess | F02K 1/06 | 60/204 |
| 2012/0247571 A1 | 10/2012 | Vauchel et al. | | |
| 2012/0280081 A1 * | 11/2012 | Calder | B64D 29/06 | 244/129.4 |
| 2013/0052005 A1 * | 2/2013 | Cloft | B64D 27/26 | 415/213.1 |
| 2013/0259641 A1 * | 10/2013 | Stewart | B64D 29/08 | 415/1 |

(56) References Cited

U.S. PATENT DOCUMENTS

| | | | | |
|---|---|---|---|---|
| 2013/0323013 A1* | 12/2013 | Mercier | .................... | B64C 7/02 415/1 |
| 2015/0143796 A1* | 5/2015 | Lacko | ....................... | F02K 1/64 60/226.2 |
| 2015/0267724 A1* | 9/2015 | Dyer | ..................... | F15B 15/261 92/15 |
| 2015/0300061 A1* | 10/2015 | Fabre | ..................... | E05C 19/145 292/113 |
| 2015/0308168 A1* | 10/2015 | Pretty | .................... | B64D 29/06 292/96 |
| 2015/0308292 A1* | 10/2015 | Forcier | ................. | B64D 29/06 415/213.1 |
| 2016/0032779 A1* | 2/2016 | Sawyers-Abbott | .......................... | F01D 25/246 60/805 |
| 2016/0084113 A1* | 3/2016 | Sawyers-Abbott | .... | B64D 29/06 415/144 |
| 2016/0138623 A1* | 5/2016 | Le Coq | .................. | B64D 29/06 239/265.11 |
| 2016/0229546 A1* | 8/2016 | Chavignier | ............ | B64D 29/06 |
| 2016/0312511 A1* | 10/2016 | Chakkera | ................ | F16H 1/203 |
| 2016/0347465 A1* | 12/2016 | Mellor | ................... | B64D 29/06 |
| 2017/0101811 A1* | 4/2017 | Parsell, Jr. | ........... | E05C 19/145 |
| 2017/0174353 A1* | 6/2017 | Joret | ...................... | B64D 29/06 |
| 2017/0226963 A1* | 8/2017 | Kopecek | ................. | F02K 1/763 |
| 2018/0079517 A1* | 3/2018 | Peyron | .................. | B64D 29/06 |

OTHER PUBLICATIONS

Supplementary European Search Report for European Application No. 14780391.0 dated Sep. 19, 2016.

International Search Report from corresponding PCT/US14/21477, dated Jun. 26, 2014.

* cited by examiner

GAS TURBINE ENGINE HYDRAULICALLY OPERATED NACELLE LATCH

CROSS-REFERENCE TO RELATED APPLICATION

This application claims priority to U.S. Provisional Application No. 61/778,494, filed Mar. 13, 2014.

BACKGROUND

This disclosure relates to a method of operating a hydraulically operated latching mechanism for a gas turbine engine nacelle.

Gas turbine engines typically include a nacelle surrounding the engine core. Portions of the nacelle can be latched to one another and to the engine itself. Gas turbine engines also typically include a fan case surrounding a fan. The nacelle can also be latched around the fan case and to the engine core. These latches keep the nacelle and engine from separating due to various load cases including the high pressures generated by the engine. The latches may need to be released for on-ground maintenance.

Currently, remotely operated latching mechanisms on a gas turbine engine are manually operated and are on occasion actuated by cables, rods, or other physical devices. Due to the remote location of latches relative to a handle in the gas turbine engine, it is difficult to actuate the latches and to confirm their successful closure.

SUMMARY

In a featured embodiment, a method of hydraulically operating a latch and a fan duct comprises the steps of providing a pressurized fluid for actuating the latch, providing a valve to control flow of pressurized fluid to the latch and the fan duct, and selectively opening the valve, whereby the pressurized fluid opens the fan duct.

In another embodiment according the previous embodiment, once the fan duct is opened, the method of hydraulically operating the latch and the fan duct further comprises the step of reducing at least one of a pressure or amount of the pressurized fluid, whereby the fan duct remains opened.

In another embodiment according to any of the previous embodiments, the method of hydraulically operating the latch and the fan duct further comprises the steps of substantially stopping the flow of pressurized fluid, whereby the fan duct closes and selectively closing the valve, whereby the latch engages.

In another embodiment according to any of the previous embodiments, the method of hydraulically operating the latch and the fan duct further includes the step of sensing the position of the latch.

In another embodiment according to any of the previous embodiments, the valve is configured for manual actuation.

In another featured embodiment, a gas turbine engine includes a fan duct with an inner structure surrounding an engine core, a fan case surrounding a fan, and at least one latch, actuated by pressurized fluid, is configured to secure a first portion of the fan duct inner structure to one of a core engine fame and a second portion of the fan duct inner structure, or is configured to secure the second portion of the fan duct inner structure to one of the core engine frame and the first portion of the fan duct inner structure, whereby actuating the at least one latch provides for releasing the first and second portions of the fan duct inner structure from said first and second portions of the core engine frame or from one another.

In another embodiment according to any of the previous embodiments, the fan duct includes a door opening system, and the door opening system is actuated by the pressurized fluid, and the pressurized fluid is controlled by at least one valve.

In another embodiment according to any of the previous embodiments, the latch is mounted on the fan duct.

In another embodiment according to any of the previous embodiments, the latch is mounted on the core engine frame.

In another embodiment according to any of the previous embodiments, the gas turbine engine further includes a valve to control the flow of pressurized fluid to the latch.

In another embodiment according to any of the previous embodiments, the fan duct includes a mechanism to hold the fan duct in an open position.

In another embodiment according to any of the previous embodiments, the hold-open mechanism is a rod.

In another embodiment according to any of the previous embodiments, the gas turbine engine further includes a position sensor to sense the position of at least one latch.

In another embodiment according to any of the previous embodiments, the pressurized fluid is supplied by a pump via at least one conduit.

In another embodiment according to any of the previous embodiments, the conduit includes a quick disconnect fitting.

In another embodiment according to any of the previous embodiments, the latch is configured to secure one of the first and second portions of the fan duct inner structure to the core engine frame.

In another embodiment according to any of the previous embodiments, the latch is configured to secure the first portion of the fan duct inner structure to the second portion of the fan duct inner structure.

These and other features can be best understood from the following specification and drawings, the following of which is a brief description.

BRIEF DESCRIPTION OF THE DRAWINGS

FIG. 6a illustrates the schematic hydraulic system of FIG. 5 with the DOS in the hold open position and a hold open mechanism.

FIG. 6b illustrates the hold open mechanism of FIG. 6a.

DETAILED DESCRIPTION

Figure 1:
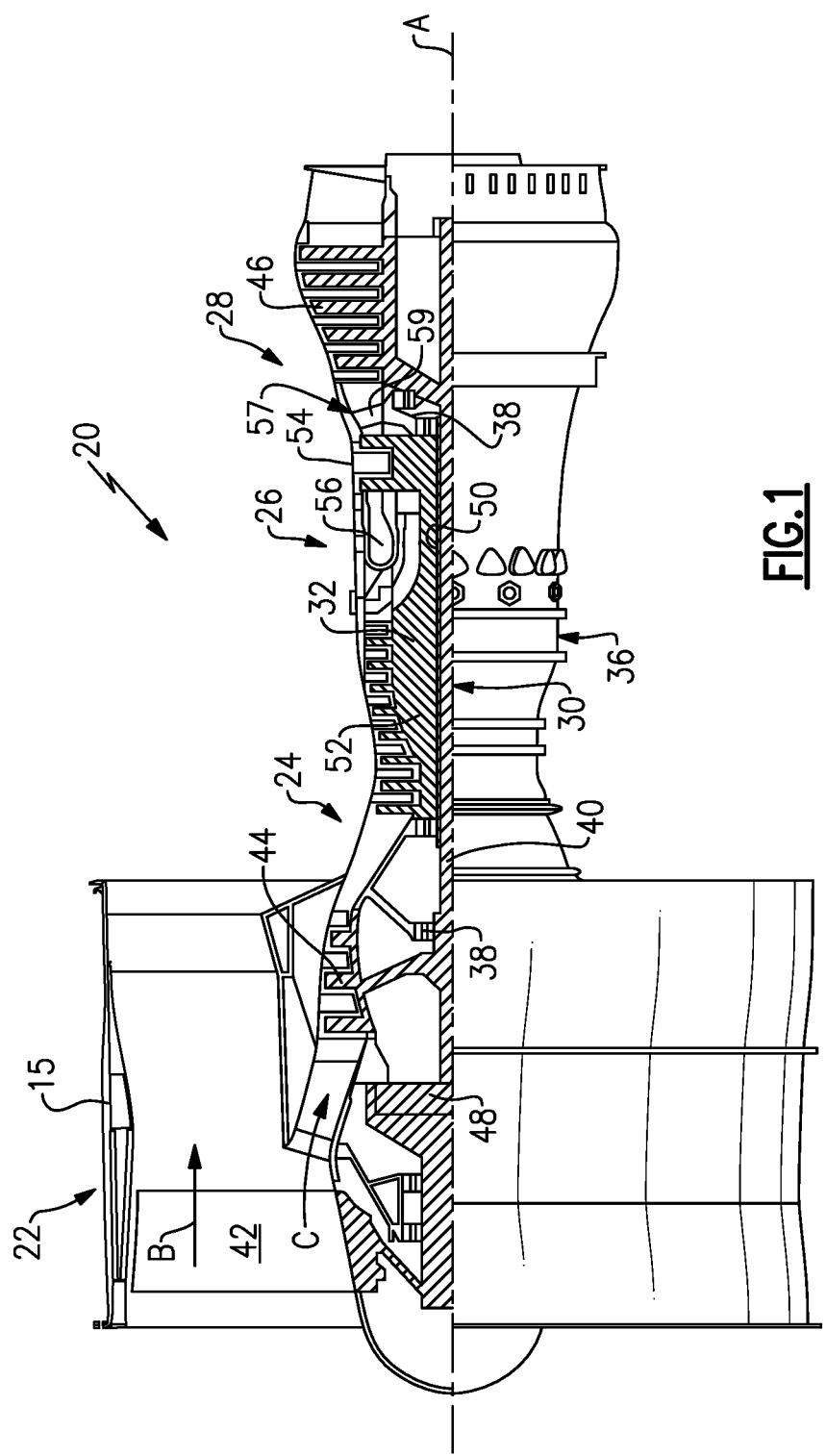
FIG. 1 illustrates a schematic gas turbine engine propulsion system.

FIG. 1 schematically illustrates a gas turbine engine propulsion system 20. The gas turbine engine propulsion system 20 is disclosed herein as a two-spool turbofan that generally incorporates a fan section 22, a compressor section 24, a combustor section 26 and a turbine section 28. The fan section 22, the compressor section 24, and the combustor section 26 are collectively known as a core engine 12. Alternative engines might include an augmenter section (not shown) among other systems or features. The fan section 22 drives air along a bypass flowpath B in a bypass duct defined within a nacelle 15, while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. A fan case 23 surrounds the fan 42. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

Figure 2A:
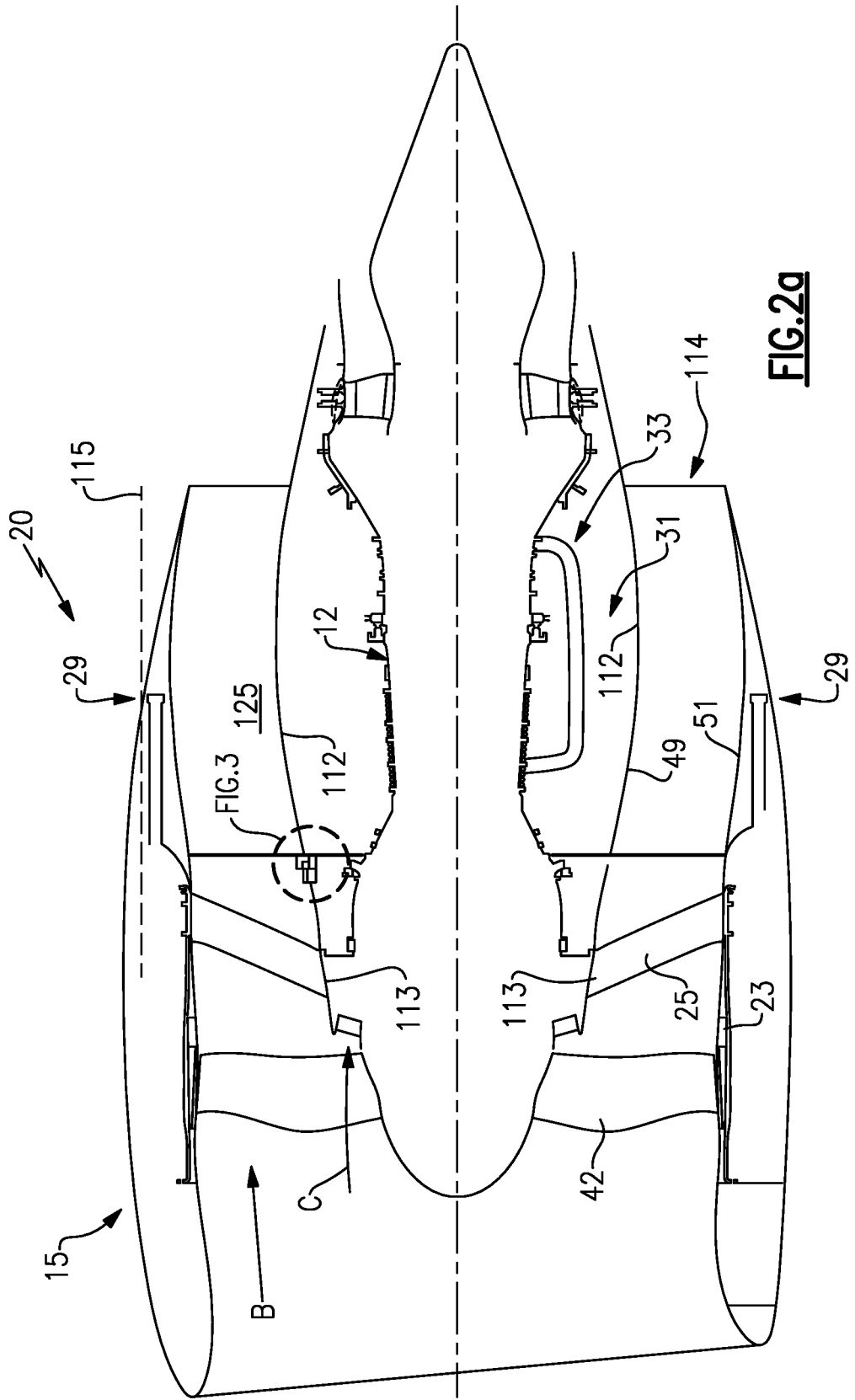
FIG. 2a illustrates a simplified schematic gas turbine propulsion system.

Referring to FIG. 2a, a fan duct inner structure 112 surrounds the core engine 12 and encloses a core compartment 31. Various components may be provided in the core compartment 31, such as fluid conduits, for example, or a compressed air duct 33. The compressed air duct 33 is under high pressure and may supply compressed air from a low or high pressure compressor stage to a high pressure turbine stage for cooling, for example, or for an airframe Environmental Control System (ECS).

Figure 2B:
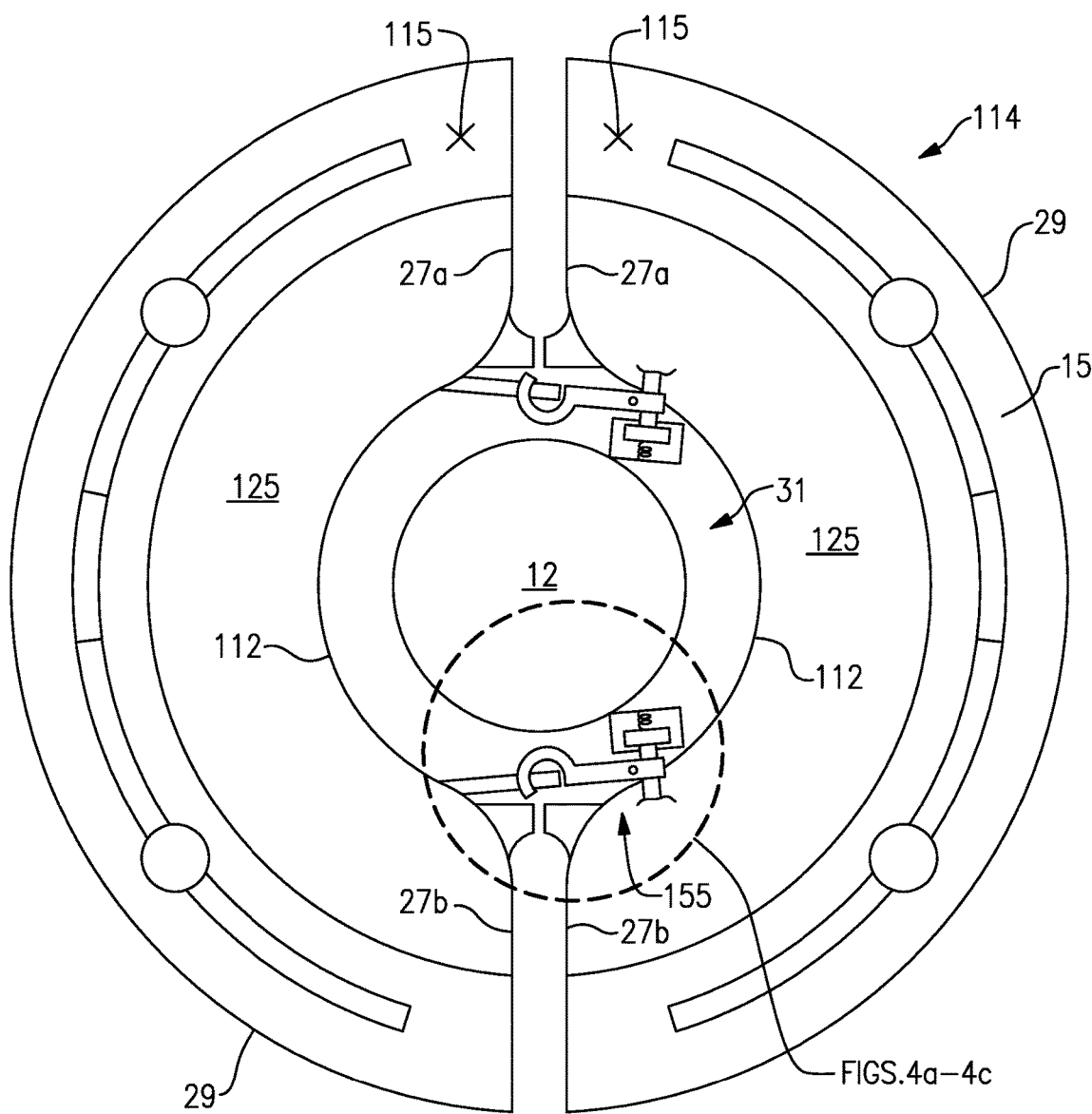
FIG. 2b illustrates a cross section of the schematic gas turbine engine propulsion system including latching systems securing first and second portions of the fan duct to one another.

Referring to FIG. 2b, in some nacelle 15 configurations, upper and lower bifurcations 27a, 27b may extend radially in the bypass flowpath 125 in locations opposite one another to accommodate wires, fluid conduits, engine mounting, or other components.

Referring again to FIG. 2a, the bypass flowpath 125 is provided by inner and outer flow surfaces 49, 51, which define portions of the nacelle 15 along an axial portion of the engine propulsion system 20. A translating sleeve 29 is arranged outwardly of the fan duct flow path 125 in the nacelle 15. The translating sleeve 29 is shown in a closed position in FIG. 2a. Bypass air B flows through the bypass flowpath 125 and produces a significant component of forward thrust.

Referring to FIG. 2b with continued reference to FIG. 2a, the nacelle 15 portion aft of the fan exit guide vanes 25 (shown in FIG. 2a) includes the translating sleeve 29, the fan duct inner structure 112, and the upper and lower bifurcations 27a, 27b, collectively known as the fan duct 114. The fan duct 114 opens on the hinge lines 115 to gain access to the core compartment 31 for maintenance or engine removal and replacement. Translating sleeve 29 may actuate portions of the nacelle 15 aft of the fan case 23 to move in the aft direction and act to reverse thrust.

Figure 3:
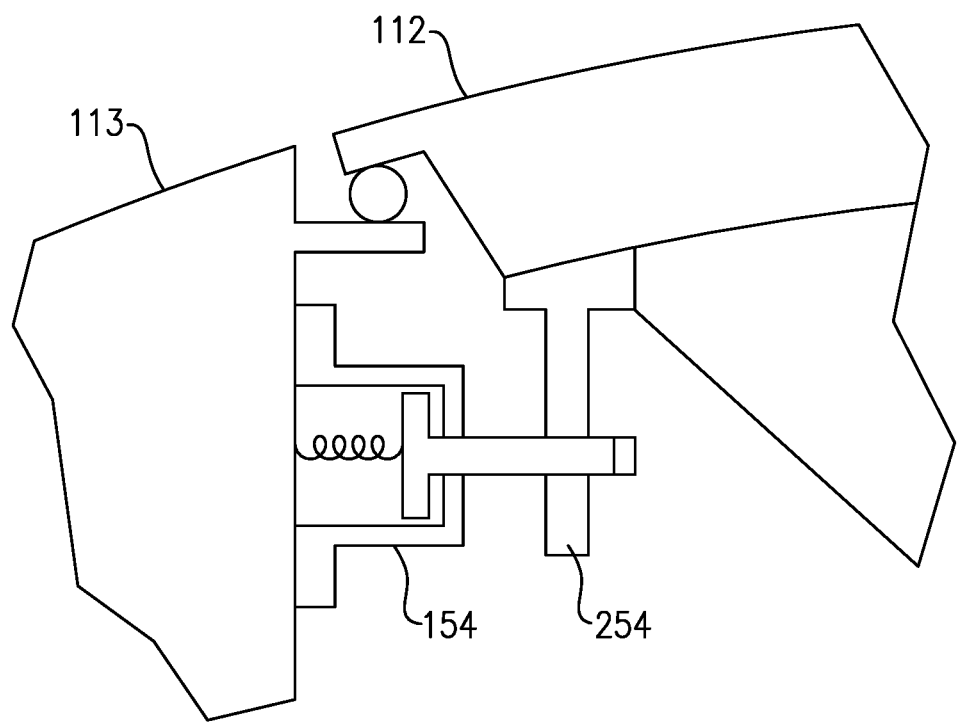
FIG. 3 illustrates an example schematic pin latch securing fan duct inner structure to a core engine frame.

As is shown schematically in FIG. 3, one or more latching mechanisms may be used to secure portions of the core engine frame 113 and the fan duct inner structure 112 to one another. In the example shown in FIG. 3, the latching mechanism 154 includes a pin latch. In this example, the pin latch 154 is mounted on the core engine frame 113 and a pin latch receptacle 254 is on the fan duct inner structure 112. In another example, the pin latch 154 may be mounted on the fan duct inner structure 112 and the receptacle 254 may be mounted on the core engine frame 113.

Figure 4A:
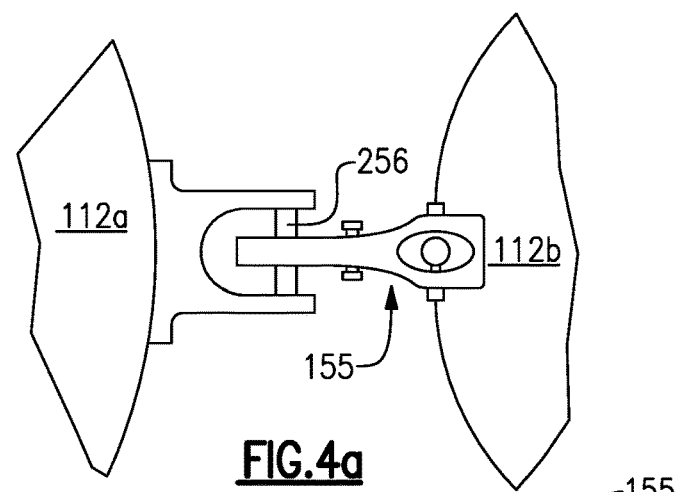
FIG. 4a illustrates a top-down detail view of the latching systems of FIG. 2b.
Figure 4B:
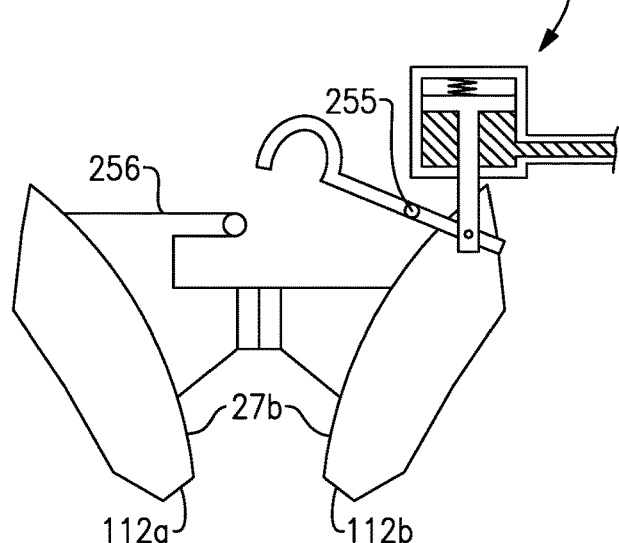
FIG. 4b illustrates a side detail view of the latching systems of FIG. 2b in the open position.
Figure 4C:
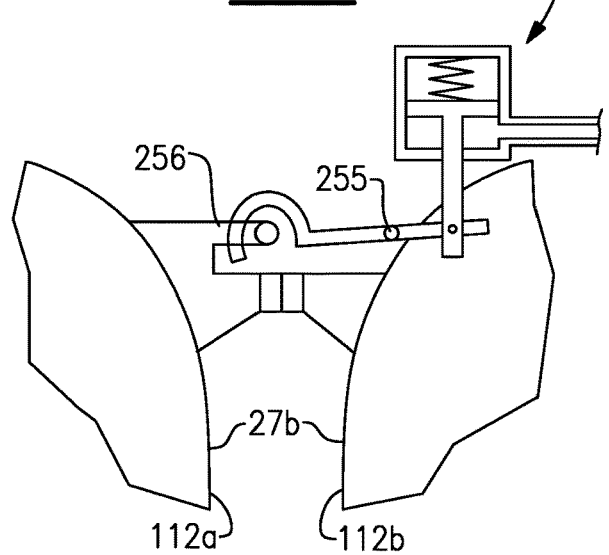
FIG. 4c illustrates a side detail view of the latching systems of FIG. 2b in the closed position.

As is shown schematically in FIGS. 4a-4c, one or more latching mechanisms may also be used to secure a first portion 112a of the fan duct inner structure 112 to a second portion 112b of the fan duct inner structure 112. In the example shown in FIGS. 4a-c, the latch 155 is a hook latch mounted on the fan duct inner structure 112. The hook latch 155 may include an additional pivot point 255. A hook latch receptacle 256 may receive the hook latch 155. FIG. 4a shows a top-down schematic view of the hook latch 155. FIGS. 4b and 4c show side schematic views of the hook latch 155 in the open and closed positions, respectively.

The latches 154, 155 can be actuated hydraulically. That is, pressurized fluid can be used to actuate the latches 154, 155 from an engaged to a disengaged position once a pressurized fluid source is connected to the latches 154, 155. A pressurized fluid source such as an automated or manually operated pump can be connected to the latches 154, 155 during on-ground maintenance and the latches 154, 155 can be opened to allow access to the desired engine parts in the core compartment 31.

Figure 5:
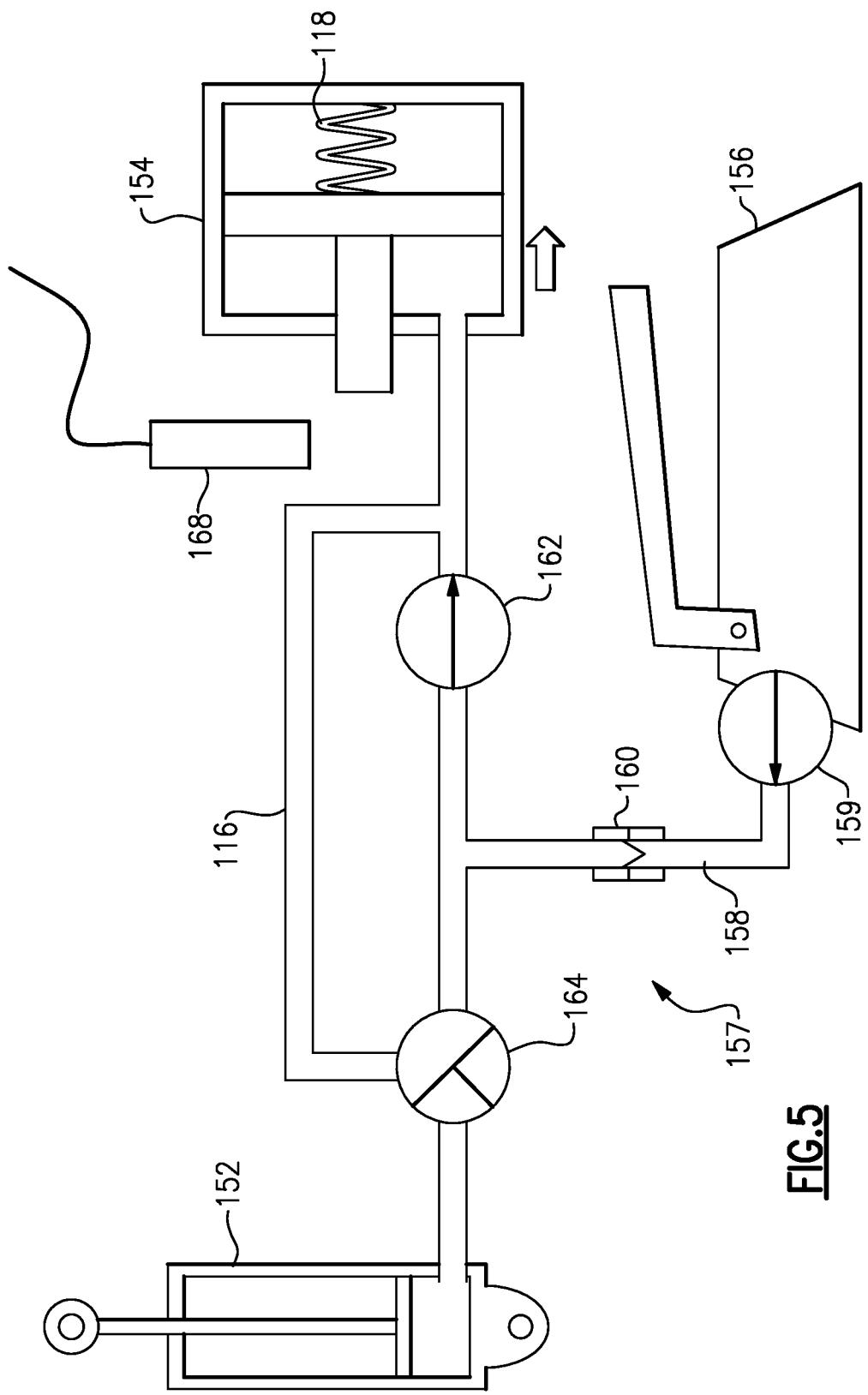
FIG. 5 illustrates a schematic hydraulic system for a fan duct door opening system (DOS) in the closed position coupled to a pin latch.

In one embodiment, release of the latches 154, 155 and opening of the fan duct 114 around hinge line 115 can be accomplished by a single hydraulic system with a source of pressurized fluid. Referring to FIG. 5, an example fan duct 114 has a door opening system (DOS) 152 coupled to a hydraulic system 157 and the latch 154 which, in this example, is a pin latch as compared with hook latch 155. Note the latch can be another kind of latching mechanism. A pump 156 supplies pressurized fluid by conduit 158 to the pin latch 154 and the DOS 152. The conduit 158 can include a fitting 160, such as a quick-disconnect fitting, for manual control of the hydraulic system 157. In another example, the DOS 152 may also include an accumulator. In another example the pump 156 may be motorized. In another example the pump 156 may be permanently attached to the rest of the hydraulic system 157.

In this example, the pump 156 provides pressurized fluid to disengage the pin latch 154. Fluid flow from the pump 156 is controlled by a pump valve 159. A one-way check valve 162 may be present between the pump 156 and the pin latch 154 to prevent inadvertent closure or re-engagement of the mechanism during opening and closing of the fan duct 114. The one-way check valve 162 may be manually operated.

Figure 6:
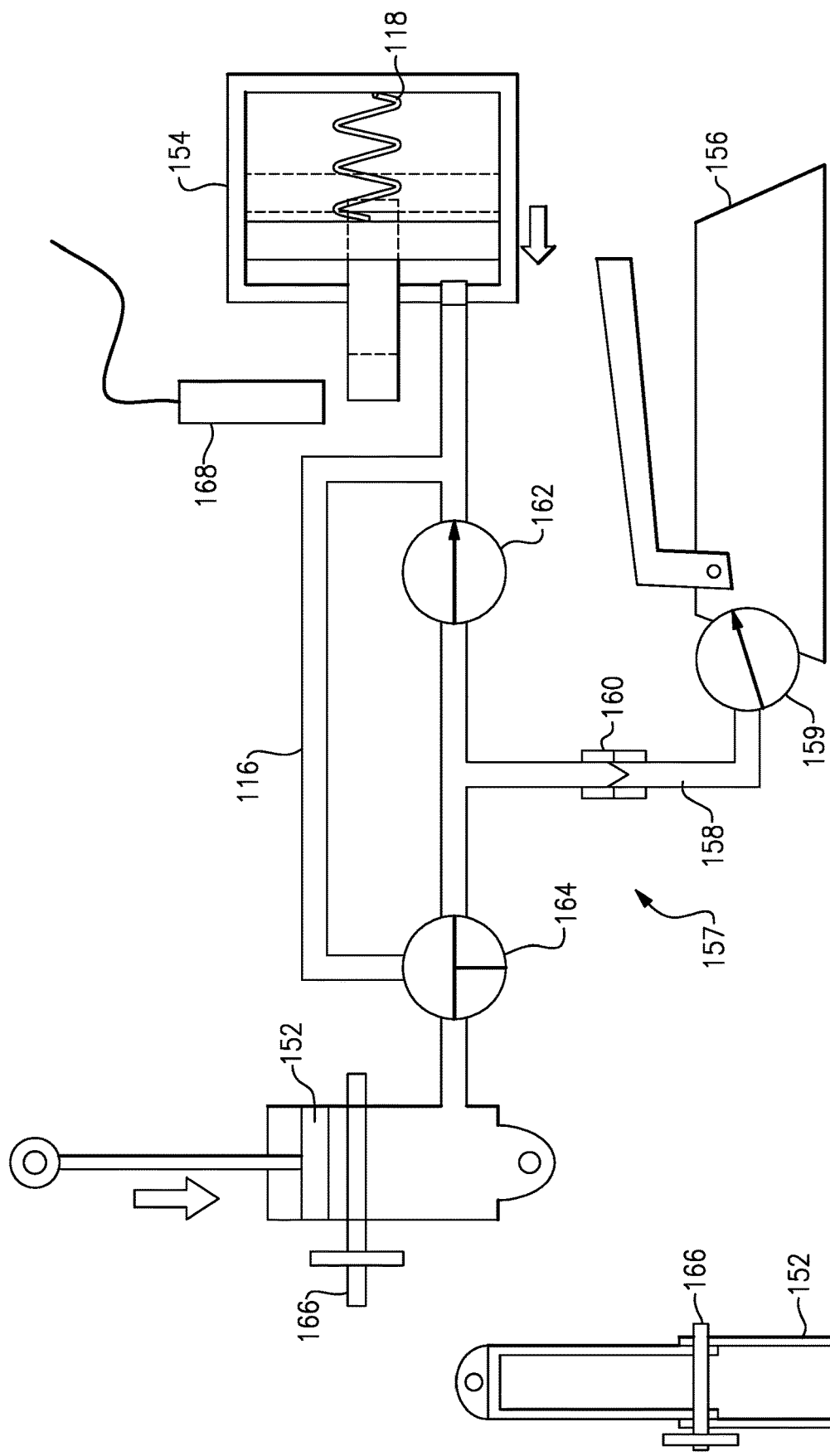

A manually operated valve 164 is present between the pump 156 and the DOS 152. The manually operated valve 164 is in a closed position when the DOS 152 is closed, as is shown in FIG. 5. As is shown in FIGS. 6a-6b, when the manually operated valve 64 is opened, the pressurized fluid supplied by the pump 156 extends the DOS 152 and consequently opens the fan duct 114. The DOS 152 and consequently the fan duct 114 can include a mechanism 166 to hold it open. In one example, the hold-open mechanism 166 may be a rod. When the hold-open mechanism 166 is in use, the pressurized fluid supplied by the pump 156 can be reduced to allow the fan duct 114 to rest on the hold-open mechanism 166. In another example, a locking mechanism may also be included in the DOS 152.

Figure 7:
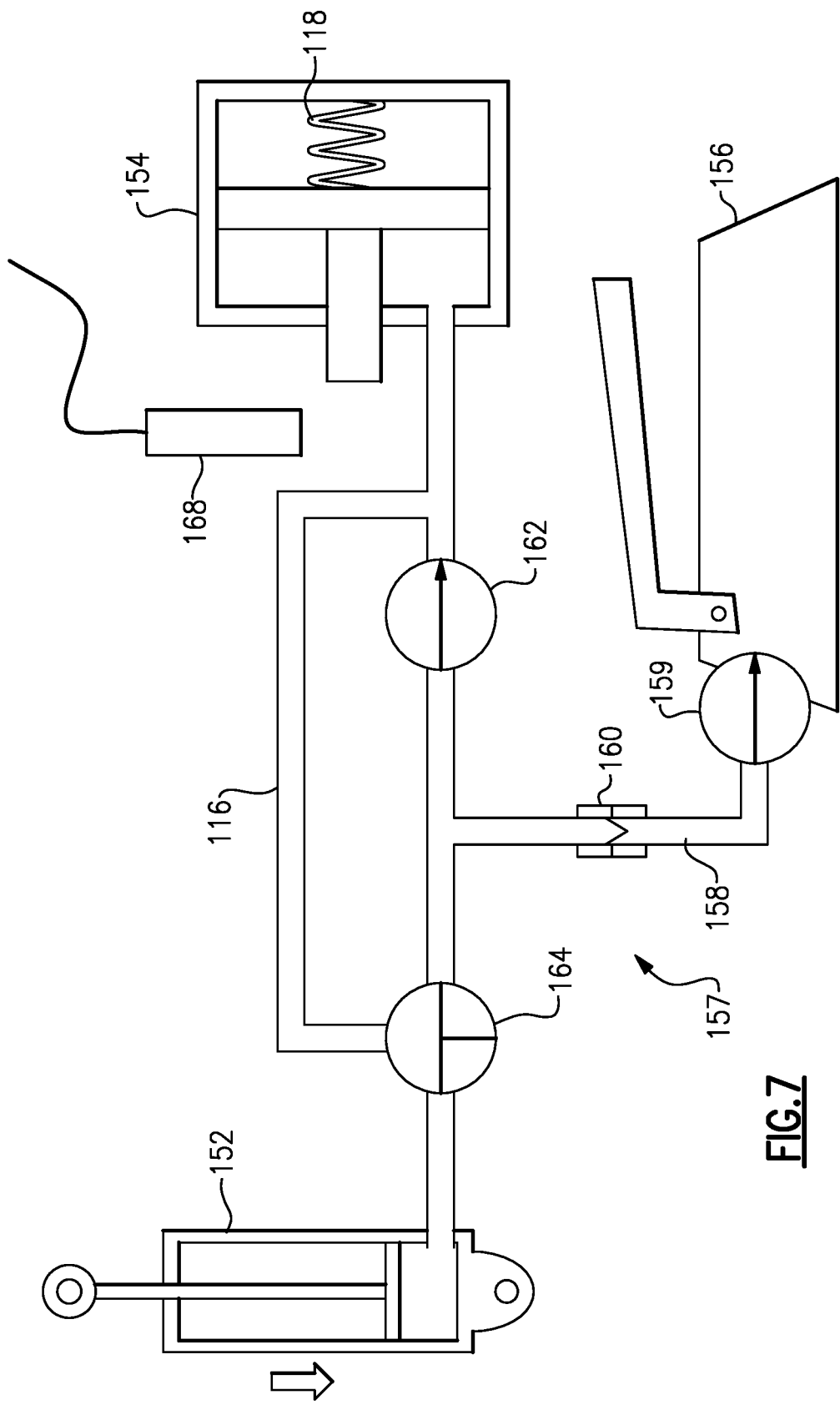
FIG. 7 illustrates the schematic hydraulic system of FIG. 5 with the DOS closing and the pin latch disengaged.

To close the DOS 152 and consequently the fan duct 114, the system is pressurized, which simultaneously opens the pin latch 154, and extends the DOS 152. This allows the hold-open mechanism 166 to be disengaged by relieving the effect of the weight of the fan duct 114. As is shown in FIG. 7, the manually operated valve 164 is in the open position and the pump valve 159 is turned to a second position to allow inflow. The weight of the fan duct 114 closes the DOS 152 and forces the pressurized fluid out of the DOS 152. The pin latch 154 remains open due to the trapped fluid in that portion of the circuit.

Figure 8:
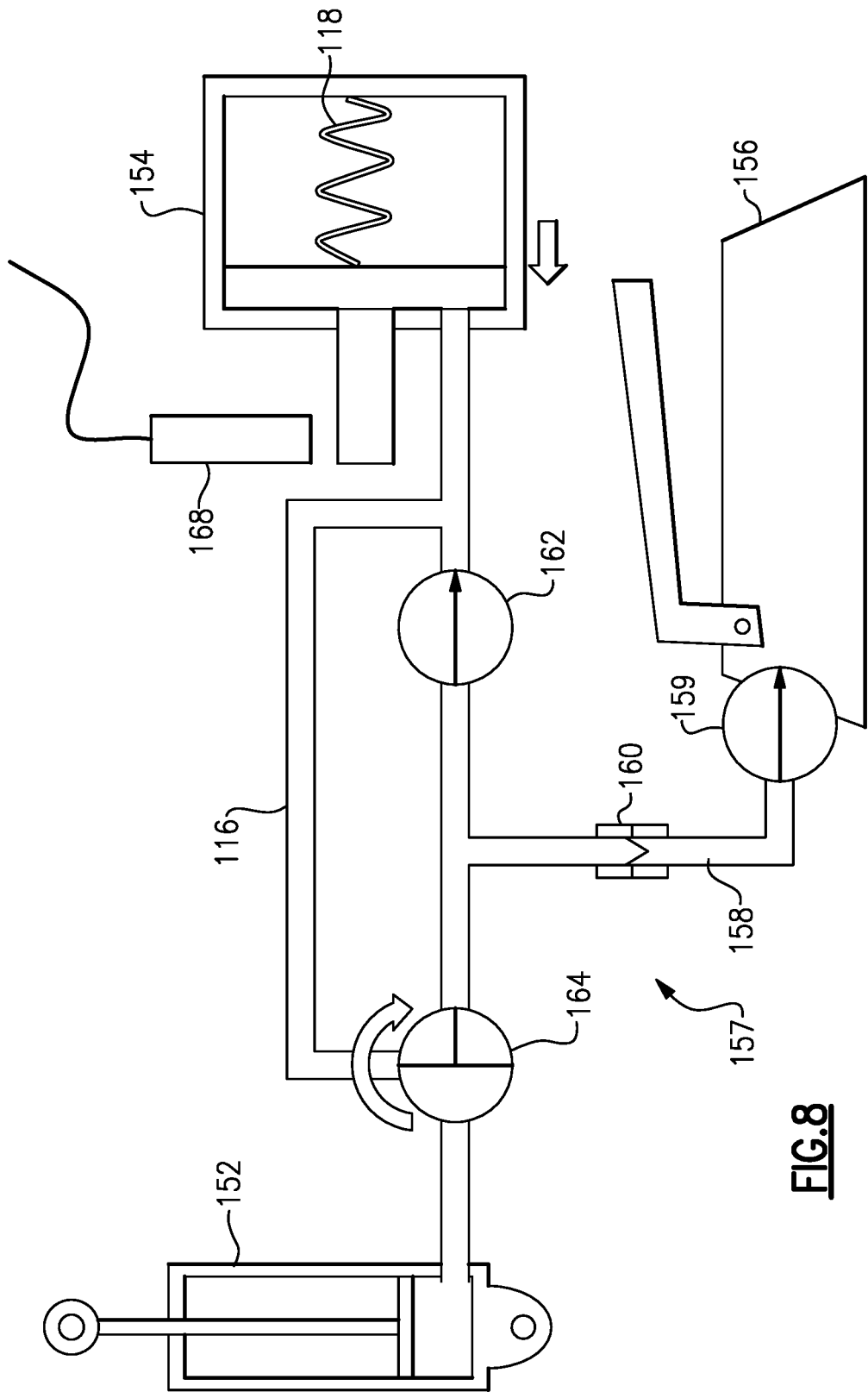
FIG. 8 illustrates the schematic hydraulic system of FIG. 5 with the DOS closed and the pin latch engaged.

As is shown in FIG. 8, once the DOS 152 is empty of fluid and the fan duct 114 is closed, the manually operated valve 164 can be turned to a second position. The spring force provided by a spring 118 in the latch mechanism will return the retained fluid from the pin latch 154 back to the reservoir in the pump 156 by the return line 116. As the pin latch 154 returns to its nominal state the latching mechanism is re-engaged so that the fan duct 114 can resist a high pressure event in the core compartment 31. In another example, the return line 116 may not be present.

In another example, the DOS 152 and the latch 154, 155 may be controlled by separate hydraulic systems.

The hydraulic system 157 can also include a position sensor 168 (FIGS. 5-8). The position sensor 168 can detect the position of the latch 154, 155. The position sensor 168 can confirm engagement or disengagement of the latch 154, 155. Because the position sensor 168 and the latch 154, 155 may be positioned in the engine core compartment 31, which may have high operating temperatures, in one example, the position sensor 168 and the latch 154, 155 are capable of withstanding a high temperature environment.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine, comprising:
a nacelle;
a fan duct including an inner structure surrounding an engine core, wherein a bypass flow path is defined between the fan duct inner structure and the nacelle;
a fan case surrounding a fan; and
at least one latch, configured to secure a first portion of the fan duct inner structure to either a core engine frame or a second portion of the fan duct inner structure, or configured to secure the second portion of the fan duct inner structure to either the core engine frame or the first portion of the fan duct inner structure,
whereby the at least one latch is configured to be actuated by a pressurized fluid;
whereby actuating the at least one latch provides for releasing the first portion of the fan duct inner structure from said core engine frame or from said second portion of said fan duct inner structure, or for releasing said second portion of said fan duct inner structure from said core engine frame or from said first portion of said fan duct inner structure.

2. The gas turbine engine of claim 1, wherein the fan duct includes a door opening system, wherein the door opening system is actuated by the pressurized fluid and the pressurized fluid is controlled by at least one valve.

3. The gas turbine engine of claim 2, wherein the at least one latch is mounted on the fan duct.

4. The gas turbine engine of claim 2, wherein the at least one latch is mounted on the core engine frame.

5. The gas turbine engine of claim 2, further comprising a valve to control the flow of pressurized fluid to the latch.

6. The gas turbine engine of claim 2, wherein the fan duct includes a mechanism to hold the fan duct in an open position.

7. The gas turbine engine of claim 6, wherein the mechanism is a rod.

8. The gas turbine engine of claim 1, further including a position sensor to sense the position of the at least one latch.

9. The gas turbine engine of claim 1, wherein the pressurized fluid is supplied by a pump via at least one conduit.

10. The gas turbine engine of claim 9, wherein the at least one conduit includes a quick disconnect fitting.

11. The gas turbine engine of claim 1, wherein the at least one latch is configured to secure one of the first and second portions of the fan duct inner structure to the core engine frame.

12. The gas turbine engine of claim 1, wherein the at least one latch is configured to secure the first portion of the fan duct inner structure to the second portion of the fan duct inner structure.

* * * * *